(12) United States Patent
Warren

(10) Patent No.: US 6,644,679 B1
(45) Date of Patent: Nov. 11, 2003

(54) TOWING ATTACHMENT AND METHOD

(75) Inventor: Brad A. Warren, 6627 Lakeridge Dr., Texarkana, TX (US) 75503

(73) Assignee: Brad A. Warren, Texarkana, TX (US)

( * ) Notice: Subject to any disclaimer, the term of this patent is extended or adjusted under 35 U.S.C. 154(b) by 0 days.

(21) Appl. No.: 10/056,613

(22) Filed: Jan. 28, 2002

(51) Int. Cl.[7] .................................................. B60D 1/18
(52) U.S. Cl. ..................... 280/457; 280/456.1; 280/480
(58) Field of Search ............................. 280/456.1, 457, 280/480

(56) References Cited

U.S. PATENT DOCUMENTS

| | | | | |
|---|---|---|---|---|
| 3,870,343 A | * | 3/1975 | McGahee | 280/457 |
| 4,558,880 A | * | 12/1985 | Nangle et al. | 280/457 |
| 4,607,858 A | * | 8/1986 | Wagner | 280/491.5 |
| 5,788,528 A | * | 8/1998 | Orr et al. | 439/358 |
| 5,893,575 A | * | 4/1999 | Larkin | 280/491.1 |
| 5,918,896 A | * | 7/1999 | Jenkins, Jr. | 280/457 |
| 6,179,317 B1 | * | 1/2001 | Hurst et al. | 280/457 |
| 6,279,939 B1 | * | 8/2001 | Austin | 280/457 |

* cited by examiner

*Primary Examiner*—Lesley D. Morris
*Assistant Examiner*—L. Lum
(74) *Attorney, Agent, or Firm*—Buskop Law Group, P.C.; Wendy Buskop

(57) ABSTRACT

A trailer hitch stinger assembly for a towing vehicle, wherein the tow vehicle has a frame, a stinger and a trailer hitch, comprising: a trailer hitch stinger having a hitch, and a retainer wherein the retainer is slidably mounted around the trailer hitch stinger and further comprises a central slot is adapted to engage the trailer hitch stinger, a right slot adapted to receive a first chain from a trailer, and a left slot adapted to receive a second chain from the trailer.

6 Claims, 3 Drawing Sheets

TOWING ATTACHMENT AND METHOD

FIELD OF THE INVENTION

The present invention relates to an attachment for a tow vehicle hitch assembly; and in particular, to a retainer for a stinger of a tow hitch.

BACKGROUND OF THE INVENTION

Hitches are used for a variety of purposes for towing boats, snowmobiles, motorcycles, and other articles. Even bicycles can tow a small trailer. Many common hitches that attach to tow vehicles use a ball hitch with a trailer having a receiving cup member. There are significant safety issues, if the trailer detaches from the tow vehicle without the use of additional safety chains. Often, chains are too short to attached from the trailer to the tow vehicles, and when turning, the short chains, if taut can simply snap off.

Towing boats is an action rampant with additional problems. Boat trailers must be backed into water for launching and retrieving the boat. A common problem encountered by boaters is that the depth of the water at the launch ramp may not be adequate relative to the depth needed to easily launch and retrieve the boat. Boats must be pushed a sufficient distance into the body of water to be able to float from the trailer, as they cannot be easily pushed off the trailer due to their weight. In some instances, the bottom of the body of water does not slope steeply enough to allow the vehicle to be backed up so that the boat may be easily launched, as the rear of the towing vehicle may be wet and in the water. The same problem also occurs when trying to retrieve the boat from the water. If the trailer is not backed a sufficient depth into the body of water, it may be difficult or impossible to pull the boat properly onto the trailer. Frequently boaters have simply detached their trailers from their vehicles, and pushed the trailers into the water. This is dangerous, and the trailer may become stuck in the mud, so that it is a major hazard and problem to get the trailer back onto dry land. A need has long existed, where a trailer can be detached from the hitch, yet the trailer still remain secured to the tow vehicle, to accommodate the need to "extend" a trailer for launching a boat at a shallow boat ramp.

It can be appreciated that a new and improved hitch assembly is needed that mounts to the tow vehicle will make trailering safer and easier. Such a device should be easily mountable and removable without modification or reconfiguration of the existing hitch system. The present invention addresses these as well as other problems associated with trailer extensions.

SUMMARY OF THE INVENTION

The present invention is directed to a hitch apparatus and in particular to an stinger safety apparatus for a trailer hitch.

The invention relates to a stinger apparatus for a towing vehicle, wherein the tow vehicle has a frame, a stinger and a ball hitch or similar hitch, wherein the stinger is slidably mounted on the tow vehicle and has a first section and a second section; the stinger apparatus comprises a retainer adapted for mounting around the stinger and abutting against the first section while mounting around the second section. The retainer comprises a three slot or tri-slot configuration, wherein a central slot is adapted to be attached to the stinger, a second slot is adapted to receive a first chain from a trailer, and a third slot is adapted to receive a second chain from the same trailer.

These features of novelty and various other advantages, which characterize the invention, are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding elements throughout the several views.

DETAILED DESCRIPTION OF THE PREFERRED EMBODIMENTS

Figure 1:
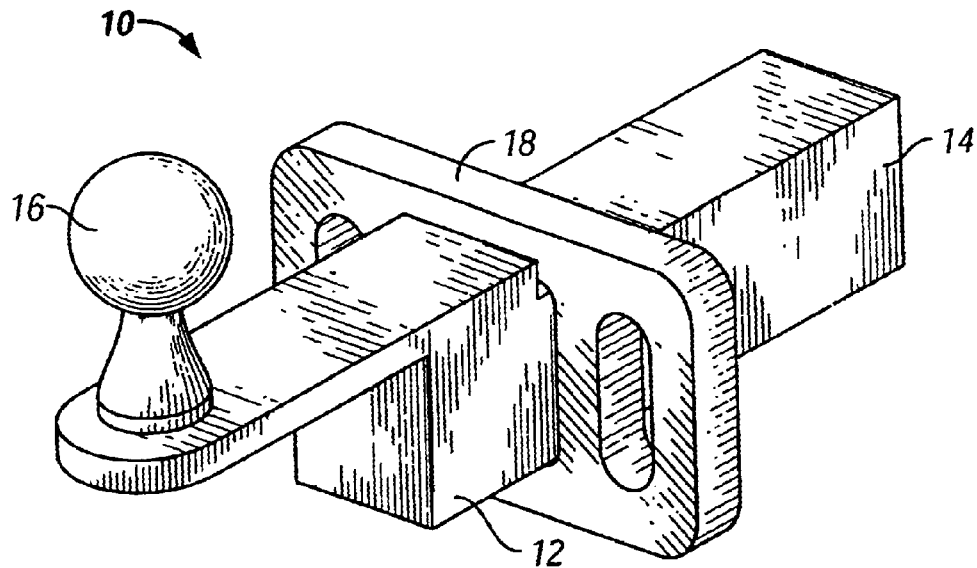
FIG. 1 shows a top plan view of a hitch with retainer mounted on the hitch according to the principles of the present invention.

Referring now to the drawings, and in particular to FIG. 1, there is shown a trailer hitch stinger 10 for connecting onto a towing vehicle. The trailer hitch stinger 10 typically includes a first section 12 and a second section 14. These two sections form the trailer hitch stinger 10 for sliding into the frame assembly on the tow vehicle.

The stinger 10 supports the ball hitch, which allows for engagement of the tow vehicle with a trailer.

The trailer hitch stinger 10 typically includes a ball 16 portion of a ball hitch that mounts onto the trailer hitch stinger 10 of the towing vehicle. It can be appreciated that although a ball type hitch is shown, other hitches may also be used. The ball 16 is generally fixed at the extreme front end of the trailer hitch stinger 10. Stock trailer hitches do not provide any way to varying the distance behind the vehicle to the trailer, such as when a boat is to be launched in a shallow body of water. The typical stinger has no means for assisting in stopping a run away trailer.

Figure 2:
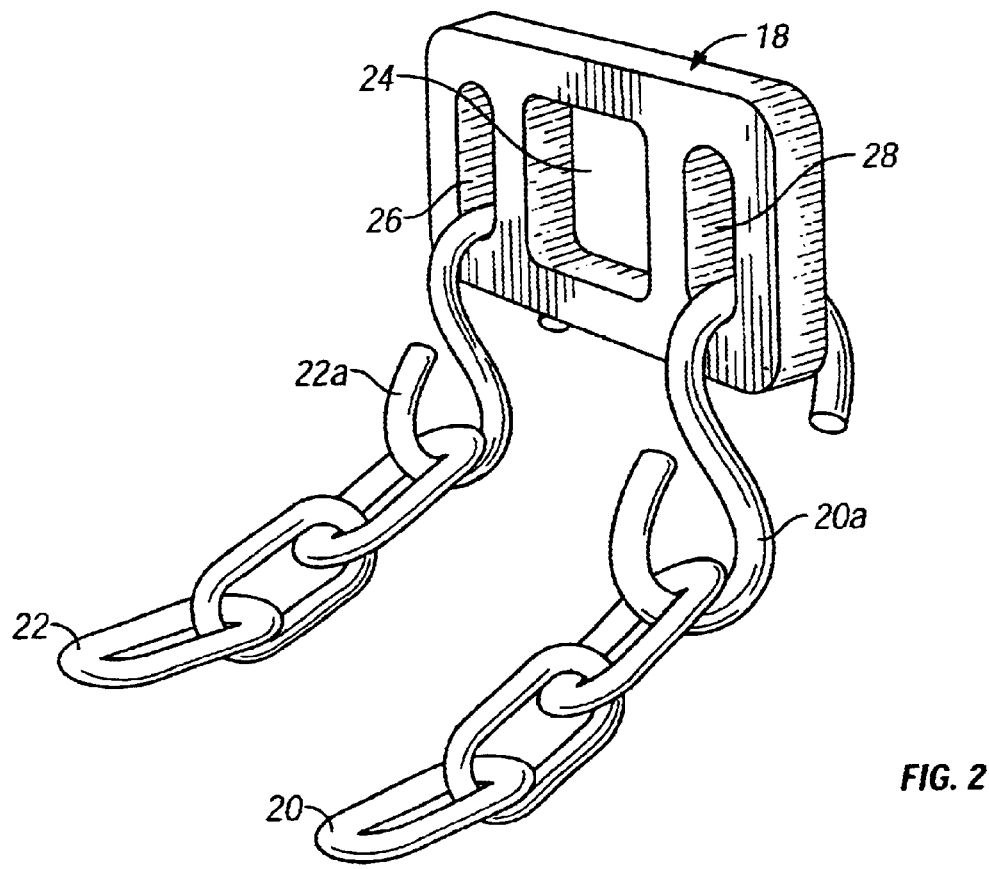
FIG. 2 shows a perspective view of the retainer with the chains attached.

As shown in FIG. 2, a retainer 18 is used on a trailer hitch stinger to not only provide a safety device, for engaging chains from a trailer, but to provide a means to extend the distance between the trailer and the tow vehicle safely, while keeping the two elements, tow vehicle and trailer safely connected. The retainer 18 is used to engage a first chain 20 having a hook 20a and a second chain 22 having a hook 22a from the trailer to be towed.

The retainer 18 most preferably has a tri slot, or three slot configuration. A central slot 24, a left slot 26 and a right slot 28. The retainer 18 is typically formed from steel plate, or possibly a steel or strong metal tube or similar structure. Power coated steel is contemplated as within the scope of the invention. Although the retainer 18 can be slidably mountable on either side of the trailer hitch stinger, it is preferably mounted centrally, abutting the first section 12, and snugly fitting around second section 14.

Figure 3:
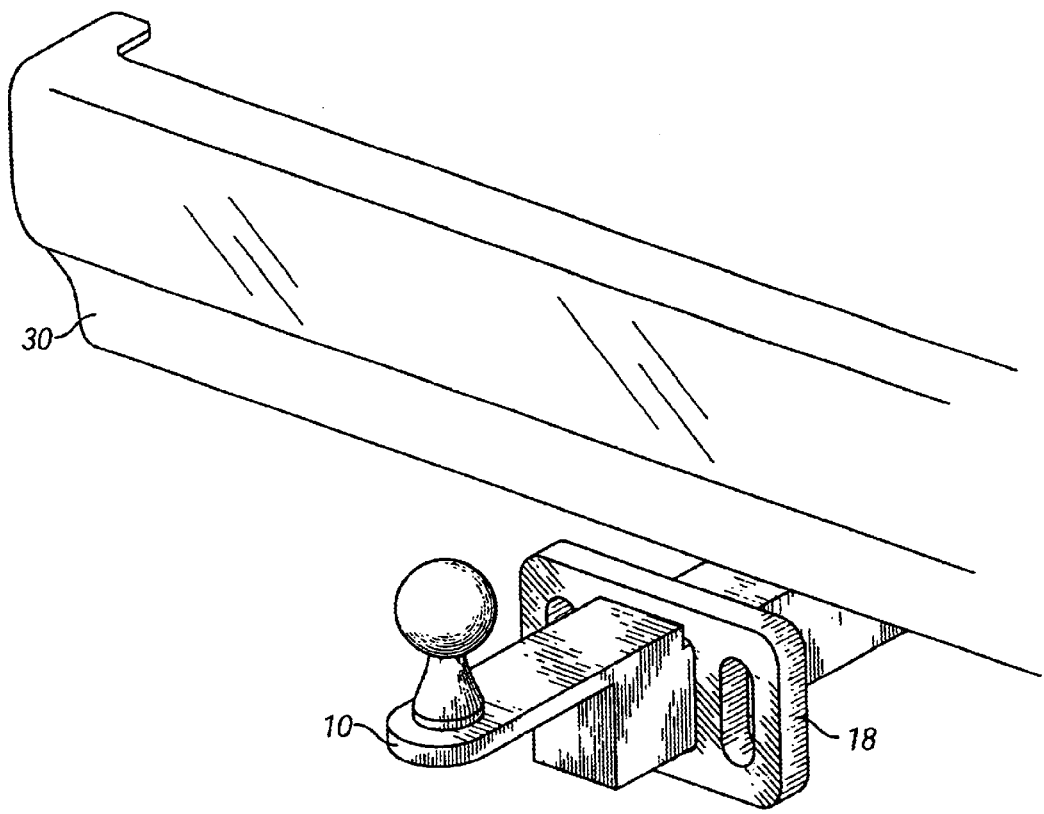
FIG. 3 shows a perspective view of the hitch and retainer mounted on a tow vehicle.

FIG. 3 shows retainer 18 mounted on the trailer hitch stinger 10 with the trailer hitch stinger engaging the frame 29 mounted on a tow vehicle 30.

Figure 4:
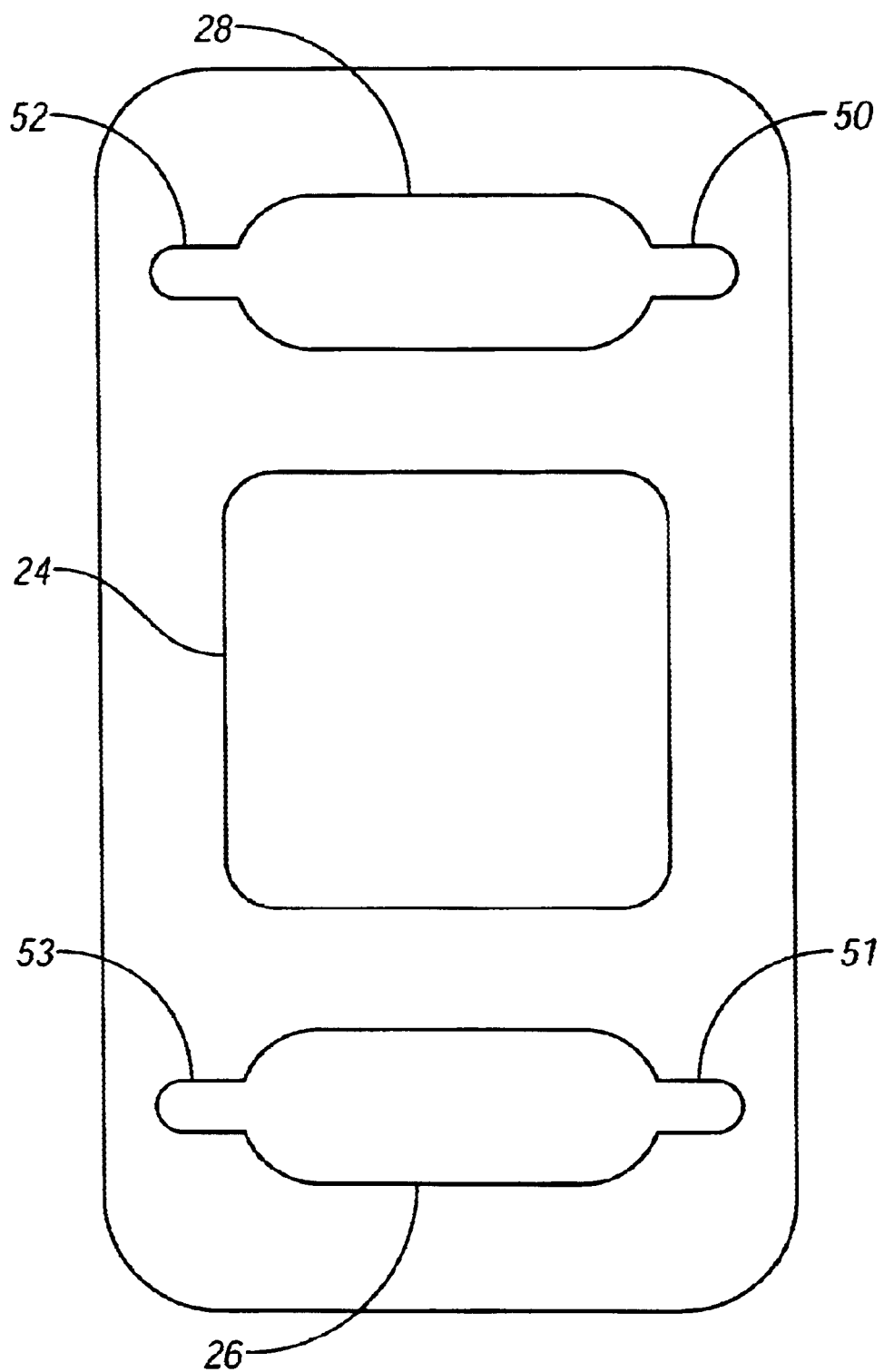
FIG. 4 shows a top view of the retainer.

FIG. 4 shows a top view of the retainer 18, wherein the central slot 24 preferably has a width of between about 1.0 and 5.5 inches, a height of between about 1.0 and 5.5 inches and a thickness of between about 0.25 to 0.75 inches. Right slot 28 and left slot 26 can have identical dimensions in the preferred embodiment, a width of between about 0.50 and 1.75 inches, a height of between about 1.0 and 5.0 inches, and a thickness of between about 0.25 to 0.75 inches. The retainer 18 preferably has a width of between about 4.0 and 10.0 inches, a height of between about 1.5 and 7.5 inches and a thickness of between about 0.25 to 0.75 inches. The towing capacity of vehicles differs; and therefore, the dimensions required for the retainer, the central slot, the right slot and the left slot may also differ from vehicle to vehicle.

The right and left slots can have slot extensions 50, 51, 52, and 53 to engage the hooks 20a and 22a, which may be used on towing chains of a vehicle. Slot extensions 50, 51, 52, and 53 preferably have a width of between about 0.125 and 0.50 inches, a height of between about 0.125 and 1.5 inches and a thickness of between about 0.25 to 0.75 inches. As stated previously, the towing capacity of vehicles differs; and therefore, the dimensions required for the retainer, the central slot, the right slot, the left slot, and each of the slot extensions may also differ from vehicle to vehicle.

The present invention also allows for easily fitting onto existing trailers and can be adapted to various sizes and shapes. The slide on construction of the retainer 18 as shown does not require any drilling of holes or other modifications to the existing trailer hitch stinger 10 and simply allows for easy mounting and removal.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:
1. A trailer hitch stinger assembly comprising:
   a. a trailer hitch stinger for slidably engaging a tow vehicle having a first section and a second section;
   b. a retainer adapted for mounting around the trailer hitch stinger and abutting against the first section while mounting around the second section, said retainer comprising a central slot adapted to engage the trailer hitch stinger, a left slot adapted to receive a first chain from a trailer, and a right slot adapted to receive a second chain from said trailer, wherein the retainer is adapted for slidably mounting to the trailer hitch stinger in a non-fixed manner;
   c. a hitch member for engaging a trailer hitch receiver.
2. The trailer hitch stinger assembly of claim 1, wherein the hitch member is a ball hitch.
3. The trailer hitch stinger assembly of claim 1, wherein the retainer is steel.
4. The trailer hitch stinger assembly of claim 1, wherein the retainer is between 1 and 2 inches in height, 1 and 2 inches in width, and 1 and 2 inches in length.
5. A tow vehicle with a trailer hitch stinger assembly comprising:
   a. a towing vehicle having a frame;
   b. a trailer hitch stinger for engaging said frame on one end, and having a ball hitch opposite to the one end, and further comprising a first section a second section, wherein said first and second sections define a substantially horizontal plane; and
   c. a retainer adapted for mounting around the trailer hitch stinger and abutting against the first section while mounting around the second section, wherein said retainer comprises a central slot adapted to be attached to the trailer hitch stinger, a right slot adapted to receive a first chain from a trailer, and a left slot adapted to receive a second chain from said trailer, wherein the retainer is slidably and removably mounted to the trailer hitch stinger in a non-fixed manner.
6. The tow vehicle of claim 5, wherein the retainer mounts around the trailer hitch stinger.

\* \* \* \* \*